United States Patent [19]
Favre

[11] 3,940,471

[45] Feb. 24, 1976

[54] REMOVAL OF RADON FROM HYDROCARBON STREAMS

[75] Inventor: John A. Favre, Bartlesville, Okla.

[73] Assignee: Phillips Petroleum Company, Bartlesville, Okla.

[22] Filed: May 18, 1973

[21] Appl. No.: 361,606

[52] U.S. Cl. .................. 423/249; 423/262; 55/66
[51] Int. Cl.² ........................................ C01F 13/00
[58] Field of Search ................ 423/249, 262; 55/66

[56] References Cited
UNITED STATES PATENTS

| | | | |
|---|---|---|---|
| 3,778,499 | 12/1973 | Stein | 423/249 X |
| 3,784,674 | 1/1974 | Stein | 423/249 |
| 3,829,551 | 8/1974 | Stein | 423/249 X |

*Primary Examiner*—Stephen J. Lechert, Jr.

[57] ABSTRACT

A process for the removal of radon from hydrocarbon streams by insertion and removal of radon-selective carriers.

16 Claims, 1 Drawing Figure

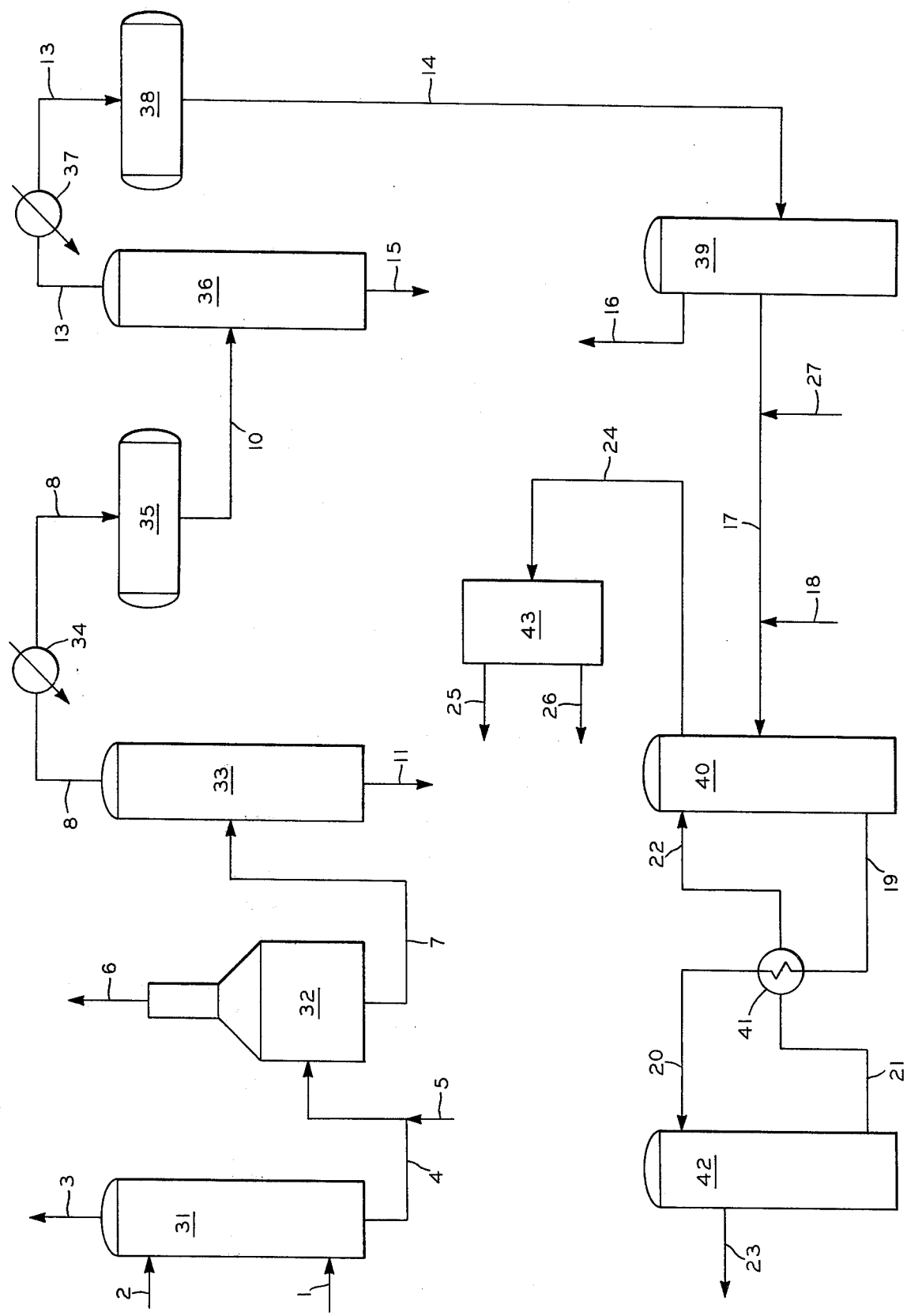

REMOVAL OF RADON FROM HYDROCARBON STREAMS

This invention relates to the purification of hydrocarbon streams. In one aspect it relates to the purification of olefinic streams. More particularly, this invention relates to the removal of radon from a hydrocarbon stream.

Radon has been found with increasing frequency in hydrocarbon streams such as natural gas produced in areas abundant in uranium. In the past, the method used to eliminate the hazards associated with radon has been to store such radon-containing hydrocarbons in underground caverns for about six weeks. During the storage period, radon decomposed to its particulate "daughter" elements, having densities great enough to settle out of the hydrocarbon. However, increased demand for hydrocarbons has dictated that such storage periods be eliminated; that such hydrocarbons be produced and shipped to consumers without such a holding period. There is, however, at present, no adequate process for removing radon from such natural gas sources.

It is therefore an object of this invention to provide a convenient method for the removal of radon from a natural gas stream.

It is another object to provide a method for the removal of radon from an olefinic stream.

It is a further object to provide a method for the recovery of radon from a hydrocarbon stream.

Other aspects, objects and advantages of the present invention will become apparent from the disclosure, the appended claims, and the drawing.

In accordance with the present invention there is provided a process whereby radon is removed from a natural gas stream by admixing propylene with such stream fractionating this mixture in such a way as to concentrate the radon in the propylene cut, admixing a carrier gas with the radon/propylene stream, treating the radon/propylene/carrier gas stream with an absorbing agent which will remove substantially all of the propylene, and thereafter separating the carrier gas from the radon.

In another embodiment of this invention there is provided a process whereby radon can be removed from a radon-containing olefinic hydrocarbon stream by admixing a carrier gas with the olefin, treating the radon/olefin/carrier gas stream with an absorbing agent which will remove substantially all of the olefin, and thereafter separating the carrier gas from the radon.

The process of this invention can be readily illustrated by reference to the drawing provided herewith, which represents a schematic view of the process.

Referring now to the drawing: a radon-containing moisture-free natural gas is introduced to the process through conduit 1 to absorber 31. Lean absorption oil is passed through conduit 2 into absorber 31. Within absorber 31 the raw gas feed is countercurrently contacted with the lean absorber oil. An overhead vapor stream is withdrawn from absorber 31 through conduit 3. Rich absorption oil is withdrawn from absorber 31 through conduit 4. Propylene is added to the rich oil in conduit 4, through conduit 5. The resulting mixture is then passed to deethanizer 32. Heat is added to deethanizer 32 by means not shown to effect separation of ethane and lighter materials from the absorber oil. Ethane and lighter materials are withdrawn as vapors from deethanizer 32 through conduit 6. Liquid is withdrawn from deethanizer 32 and introduced into dehexanizer 33 through conduit 7. Heat is added to dehexanizer 33 by means not shown to effect separation of hexane and lighter materials from the oil. Lean oil is withdrawn from dehexanizer 33 through conduit 11. Hexane and lighter materials are withdrawn from dehexanizer 33 as vapors through line 8. Said vapors pass through condenser 34 and are introduced into accumulator 35. Liquid is withdrawn from accumulator 35 through line 10. A portion of said liquid is introduced as reflux to dehexanizer 33 by means not shown and not forming a part of this invention. Another portion of liquid from accumulator 35 is passed into depropanizer 36. Butane and heavier materials are withdrawn as liquids from depropanizer 36 through line 15. Propane and lighter materials are removed as vapors from depropanizer 36 through conduit 13, passed through condenser 37 into accumulator 38. A portion of liquid from accumulator 38 is introduced as reflux to depropanizer 36 by means not shown. Another portion of liquid from accumulator 38 is passed through line 14 to splitter 39. Heat is added to splitter 39 by means not shown to effect separation of propane and propylene. Splitter 39 is operated to concentrate radon in the propylene fraction. Propane is withdrawn from splitter 39 through conduit 16. Propylene and radon are withdrawn from splitter 39 and introduced to olefin absorber 40 through conduit 17. A carrier gas, e.g., carbon dioxide, is added to the propylene/radon stream 17 through line 18.

An olefin absorbing agent, e.g., silver nitrate in ethylene glycol, is introduced into olefin absorber 40 through line 22. Within absorber 40 the propylene/radon/carbon dioxide feed is countercurrently contacted by the absorbing agent. Propylene is preferentially complexed by the abosorbing agent. An overhead vapor stream is withdrawn from absorber 40 through conduit 24. The propylene/absorbing agent complex is withdrawn from absorber 40, passed via line 19 through heat exchanger 41 and introduced into the olefin recovery zone 42 through line 20. Heat is applied to recovery zone 42 by means not shown to effect separation of the propylene from the absorbing agent. Propylene is withdrawn from recovery zone 42 through line 23. The absorbing agent is withdrawn from olefin recovery zone 42, passed through heat exchanger 41 and introduced into absorber 40 through line 22.

The radon/carrier gas fraction is withdrawn from absorber 40 and passed to radon recovery zone 43 through line 24. Within the radon recovery zone, radon is separated from the carrier gas, e.g., by absorbing the carrier gas in a caustic solution. Radon is withdrawn from recovery zone 43 through line 25 as a product of the process.

In another embodiment of this invention wherein a radon-containing olefinic hydrocarbon stream is treated to remove radon, the olefin feedstream is introduced into the system through conduit 27, thus bypassing all the system components prior to that point. A carrier gas, e.g., carbon dioxide, is added to the olefin/radon stream through line 18. The mixture is passed to olefin absorber 40 through line 17.

An olefin absorbing agent, e.g., silver nitrate in ethylene glycol, is introduced into olefin absorber 40 through line 22. Within absorber 40 the olefin/radon/carbon dioxide feed is countercurrently contacted by the absorbing agent. The olefin is preferentially complexed by the absorbing agent. Absorber 40 is maintained at a temperature which best effects formation of the complex, by means not shown. An overhead vapor stream is withdrawn from the absorber 40 through conduit 24. The olefin/absorbing agent complex is withdrawn from absorber 40, passed through heat exchanger 41 and introduced into olefin recovery zone 42 through line 20. Heat is applied to recovery zone 42 by means not shown, to effect separation of the olefin from the absorbing agent. The olefin is withdrawn from recovery zone 42 through line 23. The absorbing agent is withdrawn from recovery zone 42, passed through heat exchanger 41 and introduced into absorber 40 through line 22.

The radon/carrier gas fraction is withdrawn from absorber 40 and passed to radon recovery zone 43 through line 24. Within the radon recovery zone, radon is separated from the carrier gas, e.g., by absorbing the carrier gas in a caustic solution. Radon is withdrawn from recovery zone 43 through line 25 as a product of the process.

Auxilary equipment such as valves, pressure and temperature indicating, recording, and control equipment, flow indicating, recording and control equipment and the like are not disclosed nor described for purposes of brevity. The need for such auxiliary equipment, its installation and use are well understood by those skilled in the art.

Absorber 40 can be any means known in the art for effecting separation of one or more components from a gaseous stream. The absorber can take the form of one or more vessels or zones which do or do not contain packing materials such as clays, gravel, synthetic materials, etc., and/or fractionating means such as baffle plates, bubble trays, or the like. Either concurrent or countercurrent flow can be employed.

Within recovery zone 42, the olefinic hydrocarbon is separated and recovered from the absorbing agent. Recovery of the olefin and regeneration of the absorbing agent can be conveniently accomplished in one operation, such as by heating or by reducing pressure, or both, in order to distill off and/or desorb the absorbed olefin, or by extraction of the olefin with a second solvent which is substantially immiscible with the absorbing agent, and which may be subsequently separated from the olefin, as for example by distillation. A suitable second solvent for such an operation, for example, is n-octane, which may be employed for extraction of olefins in most instances.

The optimum temperature to be employed in the absorption step varies with the particular compound to be treated and may range up to about 150° F. or more, but temperatures below 80° F., and particularly those in the range of from about 32° to about 80° F. are suitable.

In general, atmospheric pressures are contemplated for use in the olefinic hydrocarbon absorption step of the process of the present invention, but sub- or superatmospheric pressures may be employed where desirable.

In one embodiment, the absorbing agent comprises a silver salt in an aqueous or anhydrous solution of a non-basic and preferably neutral water-soluble organic compound. Water or organic soluble silver salts which may be utilized in accordance with the present invention include the nitrate, perchlorate, fluosilicate, fluoride, etc. Care must be utilized in connection with the perchlorate in order to avoid the presence of perchloric acid, which might cause explosions. It is understood, of course, that the results obtained by the use of the different salts of silver will not necessarily be equivalent.

In another embodiment, the absorbing agent can be a rhodium complex such as dicarbonyl-rhodium (I)-3-trifluoroacetylcamphorate.

The water-soluble organic compounds which can be used in accordance with the present invention should have a neutral reaction and should not be basic. The basic compounds form undesired reaction products with the silver ion and therefore interfere with the desired separation. Of the neutral water-soluble compounds which may be utilized, the glycols, glycol ethers, and nitriles are preferred. Included in the glycols are ethylene glycol and its water-soluble homologs. Such diluents are normally employed in amounts ranging from 15 to 85 weight percent.

The radon carrier gas can be any gas which is inert to the olefin and to radon. It is generally preferable to employ carbon dioxide which has a boiling point near the boiling point of radon and which is relatively insoluble in the absorbing agent.

Radon can be separated from the carrier gas by any means known in the art; as, for example, by contacting said carrier stream with a caustic, thereby removing the carrier gas. Or, the stream can be cooled to a temperature sufficient to immobilize the carrier gas or the radon, thereby permitting separation.

Reasonable variations and modifications of this invention are possible yet still within the scope of the disclosure and without departing from the intended scope and spirit thereof.

I claim:
1. A process for removal of radon from a radon-containing olefin hydrocarbon stream, which comprises
   admixing carbon dioxide with said radon-containing olefinic hydrocarbon stream;
   contacting the resultant stream with an olefin absorbing agent in a contacting zone to form an olefin/absorbing agent complex;
   withdrawing from said contacting zone a first stream comprising said complex;
   withdrawing from said contacting zone a second stream comprising radon and carbon dioxide;
   passing said first stream to an olefin recovery zone wherein the olefin is separated from said absorbing agent;
   withdrawing from said olefin recovery zone an essentially pure olefin as one product of the process;
   passing said second stream to a radon recovery zone wherein radon is separated from said carbon dioxide; and
   withdrawing from said radon recovery zone radon as a product of the process.

2. A process according to claim 1 wherein radon is recovered from said second stream by contacting said second stream in said radon recovery zone with a caustic, thereby removing said carbon dioxide in said caustic.

3. A process according to claim 1 wherein radon is recovered from said second stream by passing said second stream into a low-temperature radon recovery zone, therein freezing out said carbon dioxide, thereby removing said carbon dioxide.

4. A process according to claim 1 wherein said absorbing agent is a compound selected from the grouup consisting of dicarbonyl-rhodium (I)-3-trifluoroacetylcamphorate, silver nitrate, silver fluosilicate, silver fluogallate, and silver fluoride.

5. A process according to claim 5 wherein said absorbing agent is dissolved in a solvent selected from the group consisting of water, ethylene glycol, glycerol, phenol, propionitrile, acetonitrile, benzonitrile, pyridine, aniline, and n-hexane, said solvent being present in an amount from about 15 to about 85 percent by weight.

6. A process according to claim 1 where separation of said first stream complex is effected by heating said complex within said olefin recovery zone.

7. A process according to claim 1 wherein separation of said first stream complex is effected by reducing the pressure within said olefin recovery zone.

8. A process according to claim 1 wherein separation of said first stream complex is effected by the combination of heat and reduced pressure within said olefin recovery zone.

9. A process for removal of radon from a radon-containing natural gas stream consisting essentially of paraffinic hydrocarbons, which comprises admixing propylene with said radon-containing natural gas stream;

passing said mixture into a separation zone wherein a stream consisting essentially of radon and propylene is separated from said paraffinic hydrocarbons;

withdrawing from said separation zone a first stream comprising said paraffinic hydrocarbons;

withdrawing from said separation zone a second stream consisting essentially of propylene and radon;

admixing carbon dioxide with said second stream;

passing the resultant mixture to a contacting zone wherein said mixture is contacted with an olefin absorbing agent to form a propylene/absorbing agent complex;

withdrawing from said contacting zone a third stream comprising said complex;

withdrawing from said contacting zone a fourth stream comprising radon and carbon dioxide;

passing said third stream to a propylene recovery zone wherein propylene is separated from said absorbing agent;

withdrawing from said propylene recovery zone a fifth stream comprising propylene;

withdrawing from said propylene recovery zone a sixth stream comprising said absorbing agent;

passing said fourth stream to a radon recovery zone wherein radon is separated from said carbon dioxide; and withdrawing from said radon recovery zone a seventh stream comprising radon as a product of the process.

10. A process according to claim 9 wherein radon is recovered from said fourth stream by contacting said stream in said radon recovery zone with a caustic, thereby removing said carbon dioxide in said caustic.

11. A process according to claim 9 wherein radon is recovered from said fourth stream by passing said stream into a low temperature radon recovery zone, therein freezing out said carbon dioxide thereby removing said carbon dioxide.

12. A process according to claim 9 wherein said absorbing agent is a compound selected from the group consisting of dicarbonyl-rhodium (I)-3-trifluoroacetylcamphorate, silver nitrate, silver fluosilicate, silver fluogallate, and silver fluoride.

13. A process according to claim 12 wherein said absorbing agent is dissolved in a solvent selected from the group consisting of water, ethylene glycol, glycerol, phenol, propionitrile, acetonitrile, benzonitrile, pyridine, aniline and n-hexane, said solvent being present in an amount from about 15 to about 85 percent by weight.

14. A process according to claim 9 wherein separation of said third stream complex is effected by heating said complex within said olefin recovery zone.

15. A process according to claim 9 wherein separation of said third stream complex is effected by reducing the pressure within said olefin recovery zone.

16. A process according to claim 9 wherein separation of said third stream complex is effected by the combination of heat and reduced pressure within said olefin recovery zone.

* * * * *